United States Patent
Grubbs et al.

(10) Patent No.: US 6,863,489 B2
(45) Date of Patent: Mar. 8, 2005

(54) EASY LOAD BARREL DOLLY

(75) Inventors: Larry Grubbs, Grants Pass, OR (US); Michael S. Trask, Rogue River, OR (US)

(73) Assignee: E--Z Load Drum Dolly, Inc., Gold Hill, OR (US)

( * ) Notice: Subject to any disclaimer, the term of this patent is extended or adjusted under 35 U.S.C. 154(b) by 0 days.

(21) Appl. No.: 10/334,805

(22) Filed: Dec. 31, 2002

(65) Prior Publication Data

US 2003/0129048 A1 Jul. 10, 2003

Related U.S. Application Data

(60) Provisional application No. 60/347,395, filed on Jan. 10, 2002.

(51) Int. Cl.[7] .............................................. B62D 33/08
(52) U.S. Cl. ..................... 414/458; 414/812; 280/46
(58) Field of Search ............................... 414/458, 429, 414/476, 812; 280/79.5, 46

(56) References Cited

U.S. PATENT DOCUMENTS

| 2,472,989 | A | * | 6/1949 | Skipper et al. | ................ | 280/46 |
|---|---|---|---|---|---|---|
| 2,600,720 | A | * | 6/1952 | Abramson | .................... | 280/46 |
| 2,665,139 | A | * | 1/1954 | Schroeder | .................... | 280/46 |
| 3,033,398 | A | * | 5/1962 | Carroll | ........................ | 414/766 |
| 3,529,736 | A | * | 9/1970 | Lebre | .......................... | 414/476 |
| 3,938,768 | A | | 2/1976 | Babcock | ...................... | 248/129 |
| D276,948 | S | | 12/1984 | Wacek et al. | ................. | D34/23 |
| 4,664,398 | A | * | 5/1987 | Mozer | ...................... | 280/43.11 |
| 4,978,103 | A | * | 12/1990 | Moisan | ........................ | 254/131 |
| 5,018,930 | A | * | 5/1991 | Hardin et al. | ................ | 414/458 |
| D340,563 | S | | 10/1993 | Kean et al. | ................... | D34/23 |
| 5,427,494 | A | | 6/1995 | Fitzgerald | .................... | 414/459 |
| D367,141 | S | | 2/1996 | Suggs et al. | ................. | D34/27 |
| 5,660,248 | A | | 8/1997 | Velisavljevic | ............... | 187/237 |
| 5,678,976 | A | | 10/1997 | Rodriguez | ................... | 414/448 |
| 5,732,960 | A | * | 3/1998 | Elam | ....................... | 414/429 X |
| 5,826,893 | A | * | 10/1998 | Snoeyenbos | ................. | 280/43 |
| 5,860,659 | A | | 1/1999 | Hart | ........................... | 280/79.5 |
| 5,893,571 | A | * | 4/1999 | Nowell | ........................ | 280/43 |

* cited by examiner

*Primary Examiner*—Eilleen D. Lillis
*Assistant Examiner*—Charles A. Fox
(74) *Attorney, Agent, or Firm*—Stoel Rives LLP

(57) ABSTRACT

A barrel dolly (10) includes a main frame (12) that has members (16, 18, 20, 22) for supporting a barrel (42) and a roller frame (14) detachable from the main frame for loading the barrel through an open end (22) of the main frame. The main frame includes bridge hooks (30) that mate with receiver notches (34) on the roller frame for attaching the roller frame to the main frame. The roller frame includes a sliding handle (38) that a user grasps to rotate the roller frame for releasing and securing the roller frame and the main frame. An optional lifting handle (54) enables the user to safely and easily load heavy barrels on the barrel dolly.

16 Claims, 5 Drawing Sheets

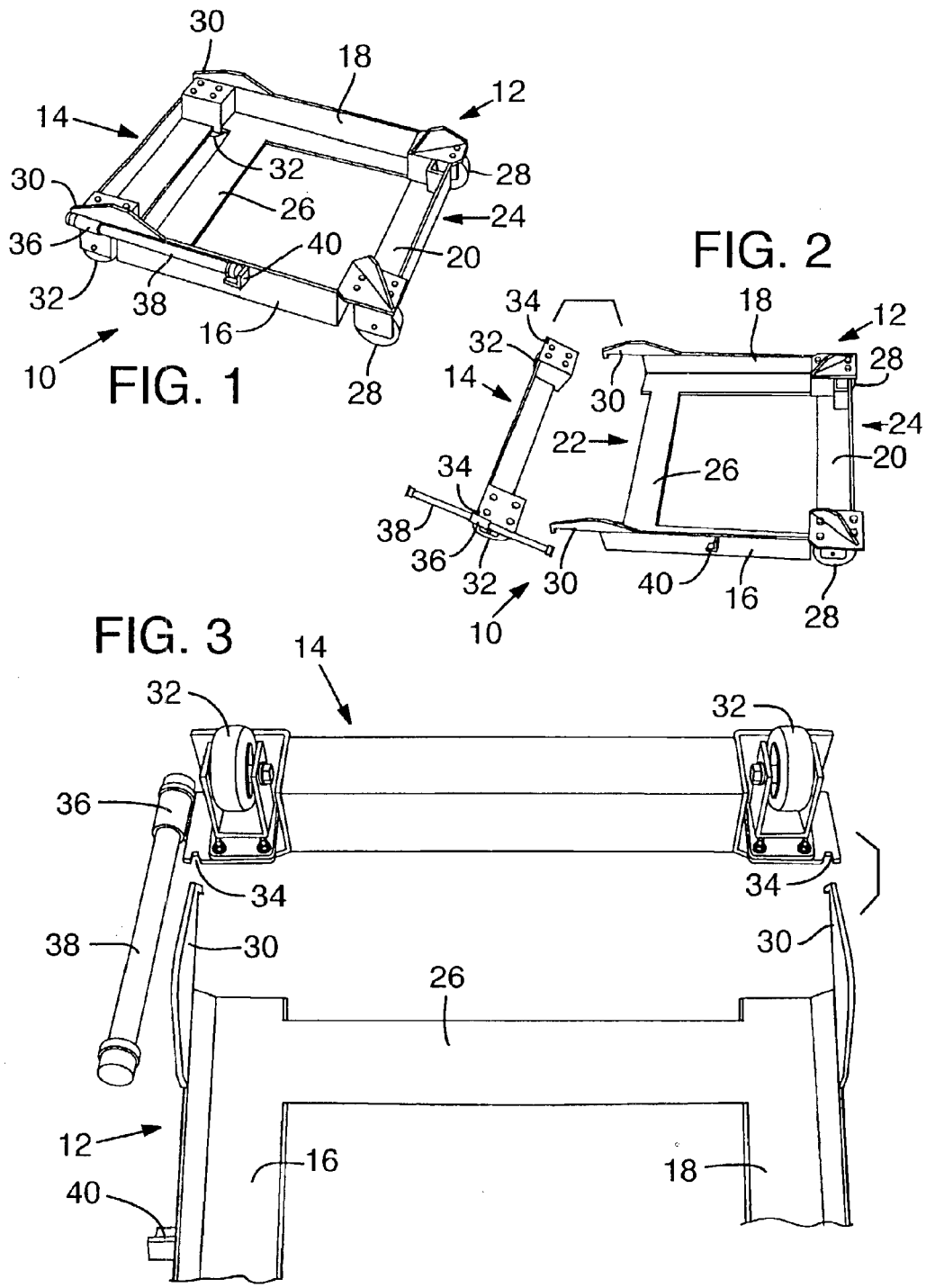

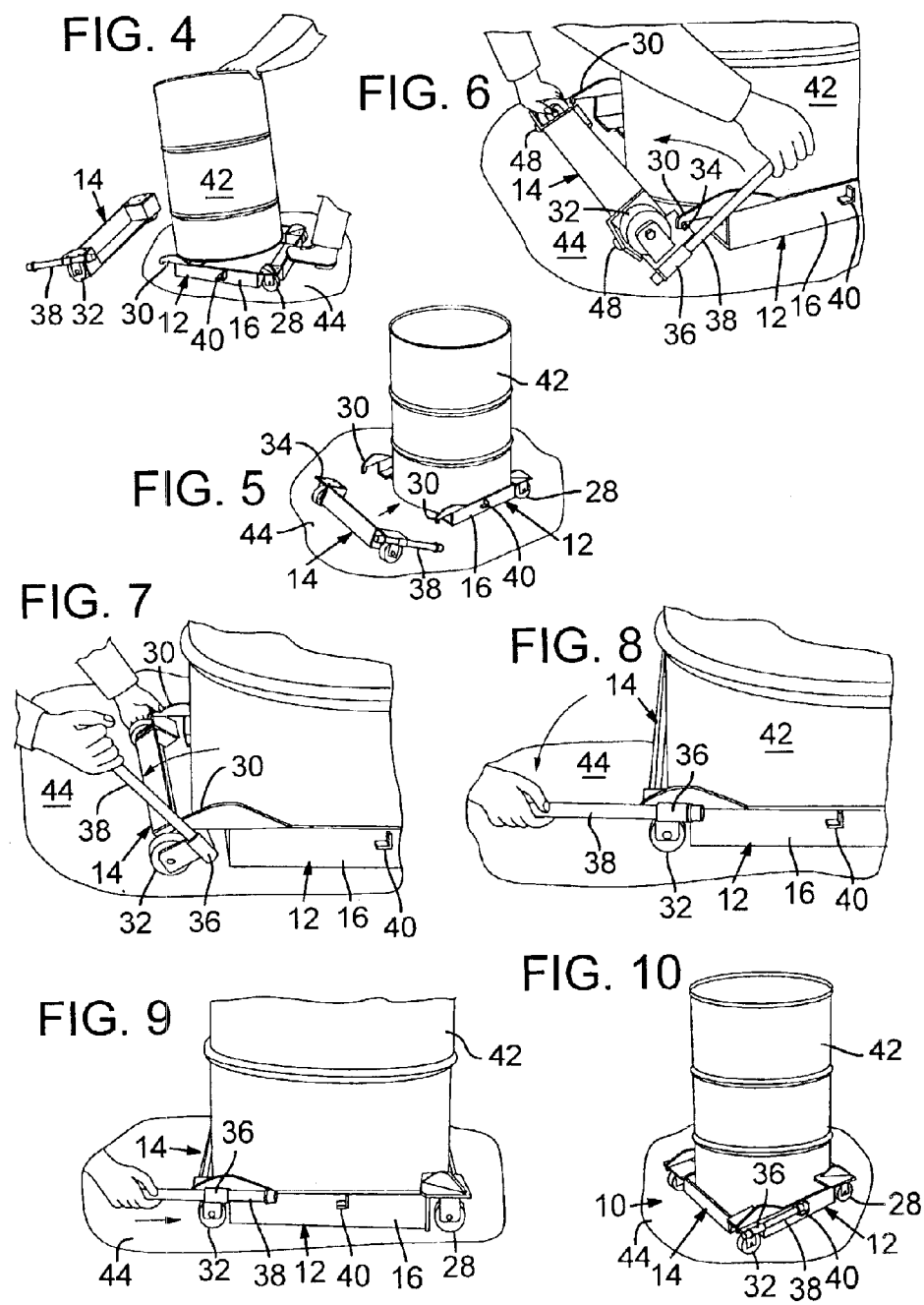

EASY LOAD BARREL DOLLY

RELATED APPLICATION

This application claims priority from U.S. Provisional Application No. 60/347,395, filed Jan. 10, 2002.

FEDERALLY SPONSORED RESEARCH OR DEVELOPMENT

Not Applicable

TECHNICAL FIELD

The present invention is directed to an apparatus for moving large containers and, in particular, for moving cylindrical barrels containing automotive liquids or other hazardous materials.

BACKGROUND OF THE INVENTION

In the automotive industry, it is common to use large barrels or barrels containing liquids such as, for example, various types of automotive oil or other liquids such as antifreeze. Typically the barrels are moved from a storage area to a working area in which the liquid is pumped from the barrel while it is in the upright position. Some substances contained in such barrels are hazardous and can cause health and/or environmental problems. Therefore, care must be taken during storage and while transporting the barrels to avoid spilling any liquids.

The barrels are very heavy and difficult to move, especially when full. It is not practical or safe to move the full barrels from a storage area to a working area without some form of transporting device. One method of transporting such barrels is to use a forklift. However, transporting vehicles such as forklifts are costly and require a great deal of space within which to operate. Hand trucks have also been used to move such barrels from one location to another. Such hand trucks typically require the barrel lifted by one person while another person positions a bottom support of the hand truck underneath the barrel. The hand truck with the barrel is then pivoted to a tilted position during transport. The user must maintain balance while transporting the barrel. This can be difficult when transporting a typical 550 pound barrel containing liquids across uneven surfaces. Other transporting devices are known but are complicated in design and function. For example, some devices require the barrel to be lifted into place by hydraulic or pneumatic lifts.

SUMMARY OF THE INVENTION

It is an object of this invention to provide a transporting device for barrels that provides safe and easy loading of barrels by a single user.

Another object of this invention is to provide a transporting device that allows the barrel to be moved and stored in a vertical position.

Yet another object of this invention is to provide a transporting device that is simple in design and easy to use.

A wheeled barrel dolly is provided that includes a main frame having bottom supports to support the bottom of the barrel and a separable roller frame that is detachable for loading the barrel onto the main frame. The main frame has an open side that includes bridge hooks that cooperate with receiver notches on the roller frame so that the bridge hooks lie flat within the receiver notches when the roller frame is attached to the main frame. The roller frame includes a sliding handle for a user to grasp and rotate the roller frame for releasing and securing the roller frame and the main frame. An optional lifting handle enables a single diminutive user to safely and easily load a heavy barrel on the barrel dolly.

Additional aspects and advantages of this invention will be apparent from the following detailed description of preferred embodiments thereof, which proceeds with reference to the accompanying drawings.

BRIEF DESCRIPTION OF THE DRAWINGS

FIG. 1 is an isometric view representing a barrel dolly of this invention including a main frame and a detachable roller frame.

FIG. 2 is an isometric view of the barrel dolly of FIG. 1 showing the roller frame detached from the main frame.

FIG. 3 is a top view of one end of the main frame and the detachable roller frame detached from the main frame.

FIG. 4 is an isometric view of a barrel being tilted for receiving the main frame of FIG. 3.

FIG. 5 is an isometric view of the barrel loaded onto the main frame.

FIG. 6 is an isometric view of the detachable roller frame being placed in alignment with the main frame.

FIG. 7 is an isometric view of the roller frame being rotated by a handle into the barrel loaded position.

FIG. 8 is an isometric view of the roller frame in its final position.

FIG. 9 is an isometric view similar to FIG. 8 with the handle being moved into a stowed and locked position.

FIG. 10 is an isometric view of the barrel dolly of this invention with a barrel loaded thereon and ready for transporting.

DETAILED DESCRIPTION OF PREFERRED EMBODIMENTS

Figure 11:
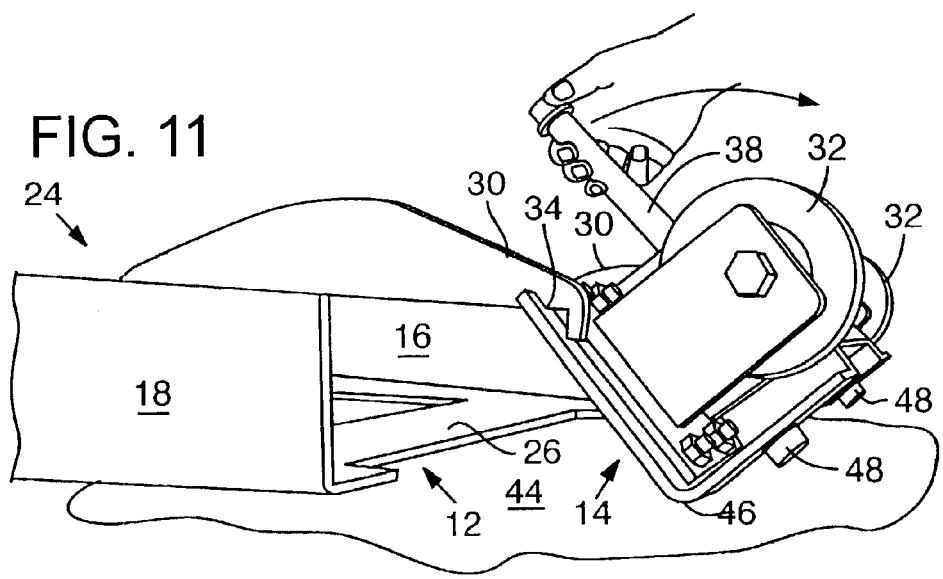
FIG. 11 is a side elevation view showing a first fulcrum point that is operable when the bridge hooks initially contact with receiver notches on the roller frame.

FIGS. 1 and 2 show a barrel dolly 10 of this invention including a main frame 12 and a detachable roller frame 14. Main frame 12 further includes opposed side members 16 and 18 and a back support member 20 connecting side members 16 and 18 at one end to form in main frame 12 an open end 22 through which a barrel (not shown) can be loaded onto main frame 12. Side members 16 and 18 and back support member 20 are preferably made of 4.76 millimeter ("mm") (0.1875 inch) thick 7.62- by 7.62 centimeter ("cm") (3- by 3-inch) angled steel sections forming bottom and side supports for the barrel. Back support member 20 forms a closed end 24 of main frame 12. A flat bottom support member 26 is located between side members 16 and 18 adjacent to open end 22 of main frame 12. A pair of swiveling caster wheels 28 are mounted at opposed sides of closed end 24 of main frame 12. Alternatively, a single wheel, multiple wheels, or a roller may be employed to form a wheel set. A pair of bridge hooks 30 protrude from side members 16 and 18 at open end 22 of main frame 12 for engagement with detachable roller frame 14. Flat bottom support member 26 is preferably formed from a 4.76 mm (0.1875 inch) thick by 7.62 cm (3 inch) wide steel plate.

Referring also to FIG. 3, detachable roller frame 14 is preferably made from a 4.76 mm (0.1875 inch) thick 7.62- by 7.62 cm (3- by 3-inch) angled steel section having non-swiveling wheels 32 mounted at its opposed ends. Alternatively a wheel set may be employed. Opposed ends of detachable roller frame 14 include receiver notches 34 that are aligned with bridge hooks 30 when attaching detachable roller frame 14 to main frame 12. One end of detachable roller frame 14 further includes a collar 36 for securing a sliding handle 38.

As shown in FIG. 1, when detachable roller frame 14 is attached to main frame 12, one end of sliding handle 38 is positioned in the direction of swiveling caster wheel 28 and stowed in a stowing bracket 40, which effectively locks together detachable roller frame 14 and main frame 12.

Loading a barrel onto barrel dolly 10 is carried out as described below.

Starting with assembled barrel dolly 10, detachable roller frame 14 is detached from main frame 12 by moving sliding handle 38 away from stowing bracket 40 and rotating detachable roller frame 14 with handle 38 to uncouple receiver notches 34 from bridge hooks 30 on main frame 12.

As shown in FIG. 4, a barrel 42 supported by a surface 44 is tilted so that open end 22 (FIG. 2) of main frame 12 can be slid under barrel 42 such that the bottom of barrel 42 is supported and constrained by opposed side members 16 and 18 (FIG. 2), back support member 20 (FIG. 2), and flat bottom support member 26 (FIG. 2).

As shown in FIGS. 3 and 5, detachable roller frame 14 is moved into position such that receiver notches 34 are aligned with bridge hooks 30.

As shown in FIGS. 3 and 6, sliding handle 38 is rotated to engage receiver notches 34 and bridge hooks 30.

As shown in FIG. 7, sliding handle 38 is further rotated such that detachable roller frame 14 lifts open end 22 (FIG. 2) of main frame 12 off surface 44. Detachable roller frame 14 includes fulcrum points that ease the lifting effort required. The fulcrum points are described below with reference to FIGS. 11–14.

As shown in FIG. 8, sliding handle 38 is rotated parallel to surface 44 such that non-swiveling wheels 32 on detachable roller frame 14 engage surface 44.

As shown in FIG. 9, detachable roller frame 14 is in its final position, and sliding handle 38 is moved to engage stowing bracket 40, locking detachable roller frame 14 to main frame 12.

FIG. 10 shows barrel dolly 10 with barrel 42 loaded thereon ready for transporting on surface 44.

FIG. 11 shows a first fulcrum point 46 that contacts surface 44 when bridge hooks 30 initially contact receiver notches 34 on detachable roller frame 14. At this time, opposed side members 16 and 18 of main frame 12 are still in contact with surface 44. First fulcrum point 46 is formed by the apex of the angled steel section forming detachable roller frame 14.

Figure 12:
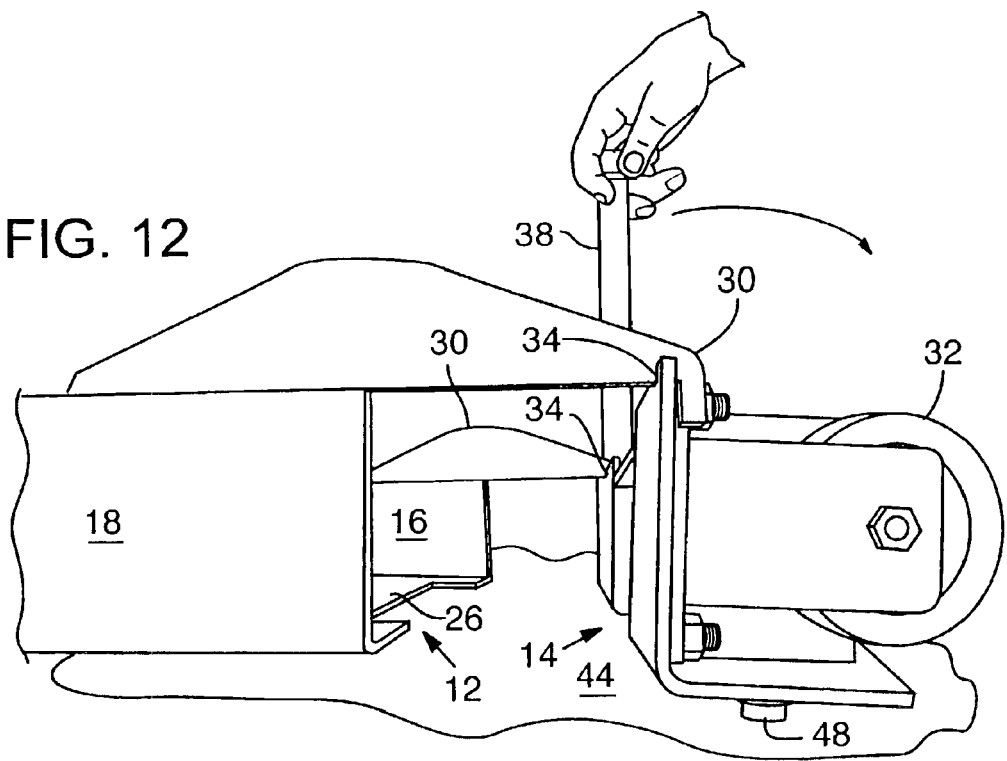
FIG. 12 is a side elevation view showing the roller frame being rotated to lift the main frame utilizing a second fulcrum point located under the detachable roller frame.

FIG. 12 shows a second fulcrum point 48 that contacts surface 44 when detachable roller frame 14 is rotated through a medial range of angles to lift opposed side members 16 and 18 off of surface 44. Second fulcrum point 48 is preferably formed by two 15.875 mm (0.625 inch) diameter, 12.7 mm (0.5 inch) tall steel buttons (only one is shown) that are welded to and distributed along the outer surface of the angled steel member forming detachable roller frame 14. Without second fulcrum point 48, the flat outer surface of the member would contact surface 44, making lifting difficult through the medial range of angles.

Figure 13:
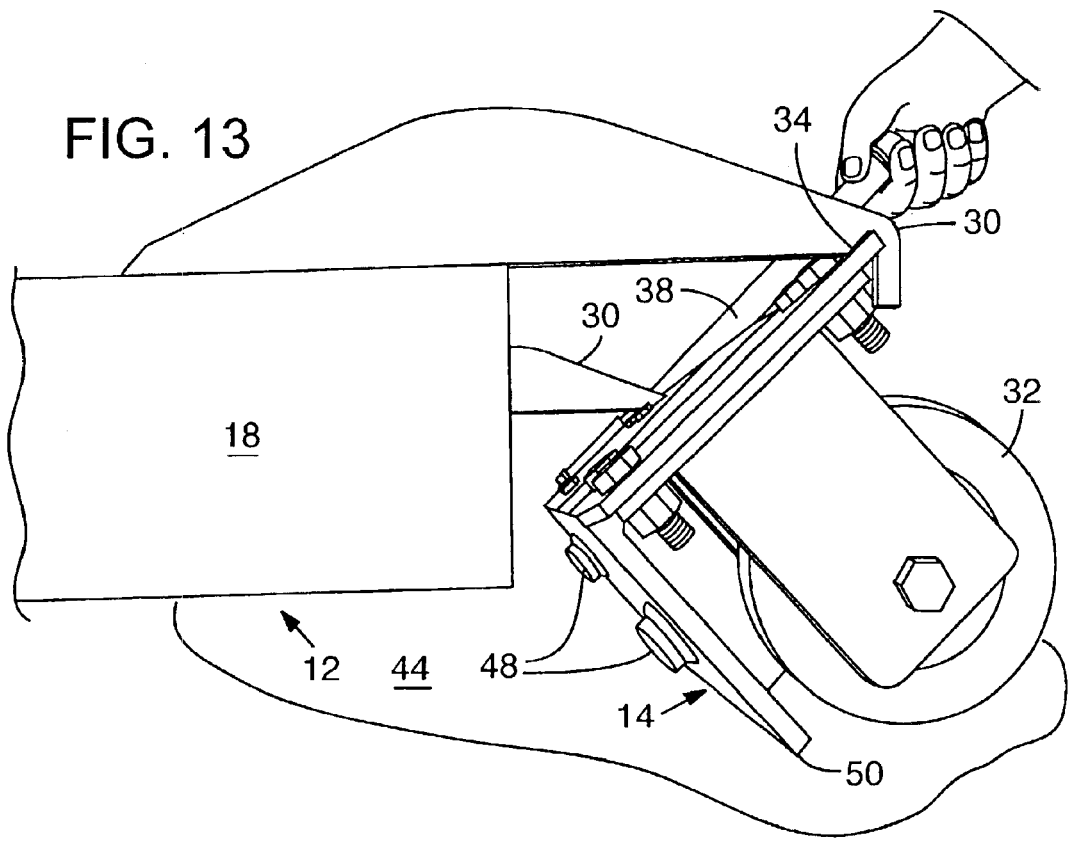
FIG. 13 is a side elevation view showing the roller frame further lifting the main frame using the bottom leg of the roller frame as a third fulcrum point.

FIG. 13 shows a third fulcrum point 50 that contacts surface 44 when detachable roller frame 14 is rotated through a final range of angles for lifting opposed side members 16 and 18 (member 16 not shown) off of surface 44. Third fulcrum point 50 is formed by the bottom leg of the angled steel section forming detachable roller frame 14. Note that downward force is applied to detachable roller frame 14 at the intersection of bridge hooks 30 and receiver notches 34. At this point in the range of lifting angles, the intersection is "over-centered" from third fulcrum point 50, which urges detachable roller frame 14 toward its final position. Skilled workers will recognize that non-swiveling wheels 32 form yet another fulcrum point as detachable roller frame 14 rotates to its final position.

Figure 14:
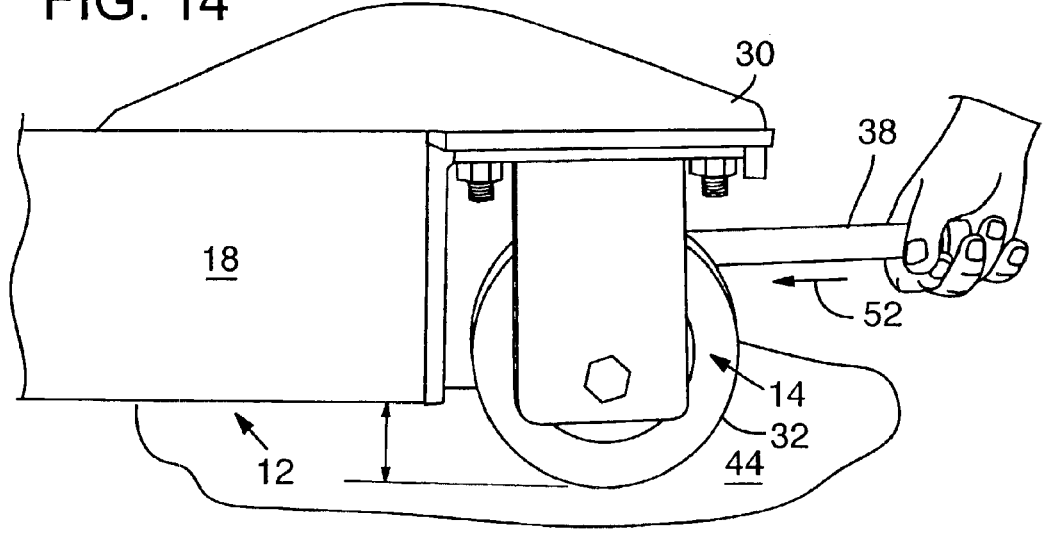
FIG. 14 is a side elevation view of the roller frame rotated to a final position with the handle in an unlocked position.

FIG. 14 shows detachable roller frame 14 rotated to its final position with non-swiveling wheels 32 contacting surface 44. The final position of detachable roller frame 14 is stable, but moving sliding handle in a direction 52 such that it engages stowing bracket 40 (not shown), safely locks detachable roller frame 14 in the final position. In the final position, opposed side members 16 and 18 and, therefore, main frame 12 are elevated about 3.175 cm (1.25 inches) above surface 44.

Figure 15:
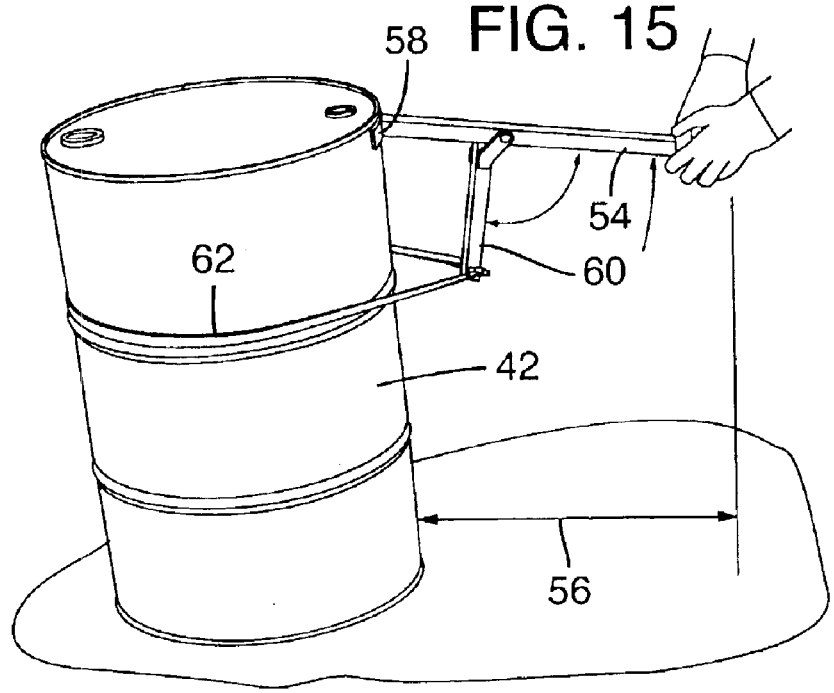
FIG. 15 is an isometric view of a lifting handle and sling employed to ease tilting the barrel as represented in FIG. 4.

FIG. 15 shows a lifting handle 54 that eases the tilting of barrel 42 for initial loading on main frame 12 as shown in FIG. 4. The distal end of lifting handle 54 includes a barrel support member 58 for firmly gripping barrel 42. Near the midpoint of lifting handle 54 is attached a jack stay 60 that pivots between a lifting position (shown in FIG. 15) and a storage position (shown in FIG. 16.). A sling 62 is captivated at the pivoting end of jack stay 60 and is of a length sufficient to encircle barrel 42. Sling 62 is preferably made from nylon webbing. Raising lifting handle 54 transfers a lifting force to barrel support member 58 and a countering force to sling 62, thereby making it possible for a single diminutive user to safely and easily load a 600 pound barrel on barrel dolly 10. Using lifting handle 54 also moves the user a distance 56 away from barrel 42 to provide space for the user to push main frame 12 under tilted barrel 42 as shown in FIG. 4.

Figure 16:
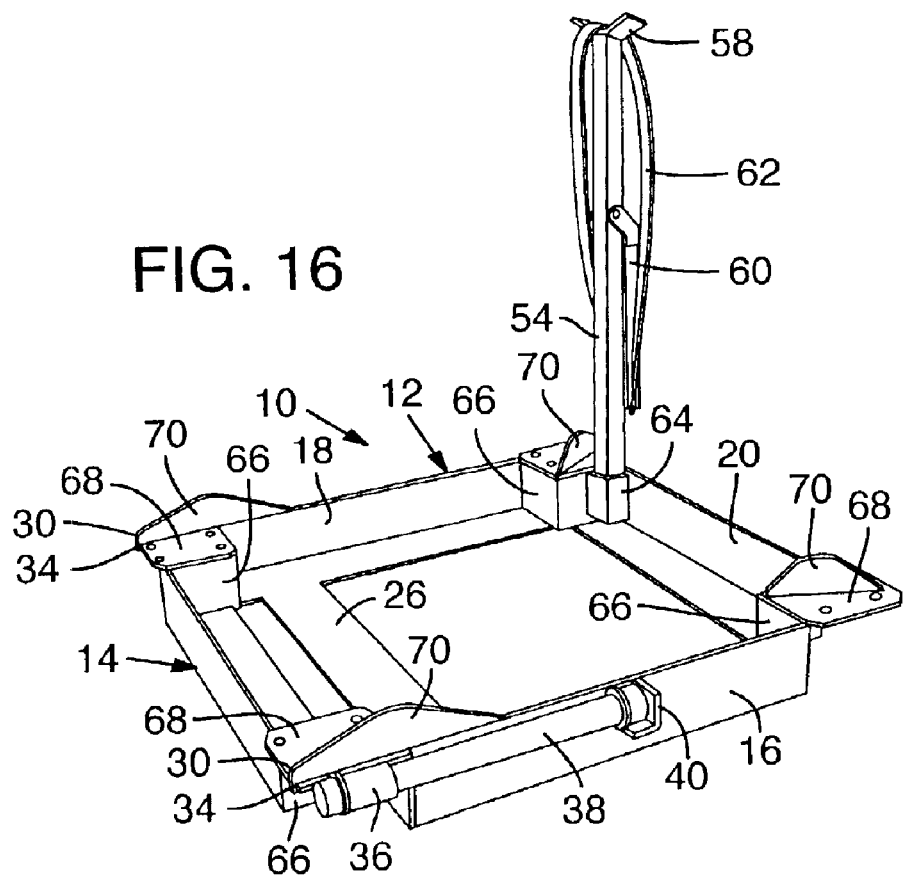
FIG. 16 is an isometric view of the lifting handle stowed in a storage bracket located on the barrel dolly.

FIG. 16 shows lifting handle 54 stowed in a storage bracket 64 that is preferably attached to a corner of back support member 20 where it joins one of wheel boxes 66. This location for storage bracket 64 prevents interference with barrels loaded on barrel dolly 10. Storage bracket 64 is sized to allow a sliding fit to lifting handle 54.

Wheel boxes 66 are formed from right angle bent 4.76 mm (0.1875 inch) thick steel plates. Two of wheel boxes 66 are welded at the corner junctions of back support member 20 and opposed side members 16 and 18. The other two wheel boxes 66 are welded to the opposed ends of detachable roller frame 14. Wheel mounting plates 68 formed from 4.76 mm (0.1875 inch) thick steel are welded to the top of each of wheel boxes 66. Gussets 70 formed from 6.35 mm (0.25 inch) thick steel provide shear-strength support for wheel boxes 66, to which associated wheels 28 and 32 are attached.

Wheels 28 and 32 are preferably 7.62 cm (3.0 inches) in diameter and formed from polypropylene to resist deterioration from petroleum products and solvents. Each of wheels 28 and 32 have a 195 kilogram (430 pound) capacity giving barrel dolly 10 a maximum 600 kilogram (1,320 pound) capacity.

The inside dimensions of barrel dolly 10 are about 59.2 by 59.2 cm (23.3125 by 23.3125 inches) to allow clearance for barrel 42, which is preferably a 55 gallon drum. The widest dimension of barrel dolly 10 is about 66.36 cm (26.125 inches), which is the distance between the outer edges of wheel mounting plates 68 attached at each end of back support member 20.

Skilled workers will recognize that portions of this invention may be implemented differently from the implementations described above for a preferred embodiments. For example, barrel dolly 10 may be adapted for loading, supporting, and transporting a variety of containers and goods including barrels, petroleum and chemical and drums, and other-shaped containers and goods of various sizes and weights. Of course the fulcrum points may be implemented as one or more arcuate members attached to detachable roller frame 14.

It will be obvious to those having skill in the art that many changes may be made to the details of the above-described embodiments without departing from the underlying principles of the invention. The scope of the present invention should, therefore, be determined only by the following claims.

We claim:

1. A dolly apparatus for loading and transporting a container on a surface, comprising:
    a generally U-shaped main frame having a back support member supported by a first wheel set and mechanically coupled to opposed side members that form an open end of the main frame through which the container can be loaded;
    a pair of bridge hooks attached to the opposed side members and protruding from the open end of the main frame; and
    an elongated roller frame having opposed ends supported by a second wheel set, the opposed ends including receiver notches that are aligned to receive the bridge hooks protruding from the main frame, the roller frame being rotatable from a bridge hook receiving angle to a final angle and further including a first fulcrum point that contacts the surface when the roller frame is at the bridge hook receiving angle, a second fulcrum point that contacts the surface when the roller frame is at an intermediate angle between the bridge hook receiving angle and the final angle, and a third fulcrum point that contacts the surface when the roller frame is between the intermediate angle and the final angle, for providing stable attachment of the roller frame to the main frame and thereby support by the first and second wheel sets of the dolly apparatus and any container loaded thereon.

2. The apparatus of claim 1, further including a bottom support member attached between the opposed side members and adjacent to the open end of the main frame.

3. The apparatus of claim 1, in which the roller frame has captivated thereto a sliding handle for rotating the roller frame from the bridge hook receiving angle to the final angle.

4. The apparatus of claim 3, in which the main frame further includes a stowing bracket for receiving an end of the sliding handle when the roller frame is attached to main frame to lock the roller frame at the final angle.

5. The apparatus of claim 1, in which at least one of the first and second wheel sets includes swiveling caster wheels.

6. The apparatus of claim 1, in which at least one of the first and second wheel sets includes two wheels.

7. The apparatus of claim 1, in which the roller frame further includes at least one arcuate member that serves as a fulcrum while the roller frame is rotated between the bridge hook receiving angle and the final angle.

8. The apparatus of claim 1, further including a lifting handle and a storage bracket attached to the main frame for storing the lifting handle, the lifting handle usable for tilting the container to ease its loading on the main frame.

9. The apparatus of claim 1, in which the container is a 55 gallon drum.

10. A method of loading and transporting a container on a surface, comprising:
    providing a generally U-shaped main frame having an open end that contacts the surface, a closed back end supported above the surface by a first wheel set, and bridge hooks that protrude from the open end;
    tilting the container and sliding the open end of the main frame under the container such that the main frame supports the container
    providing a roller frame supported by a second wheel set and including receiver notches that are spaced apart to receive the bridge hooks protruding from the main frame, the roller frame further including a first fulcrum point that contacts the surface when the roller frame is at a bridge hook receiving angle, a second fulcrum point that contacts the surface when the roller frame is at an intermediate angle between the bridge hook receiving angle and a final angle, and a third fulcrum point that contacts the surface when the roller frame is between the intermediate angle and the final angle;
    rotating the roller frame to the bridge hook receiving angle such that the receiver notches engage the bridge hooks;
    rotating the roller frame through the intermediate angle such that the receiver notches lift the bridge hooks and thereby the open end of the main frame and the container off the surface; and
    rotating the roller frame to the final angle such that the roller frame and the main frame are attached and support the container for transporting above the surface by the first and second wheel sets.

11. The method of claim 10, in which the rotating is carried out by a handle attached to the roller frame.

12. The method of claim 11, further including locking the roller frame to the main frame by securing the handle to the main frame when the roller frame is at the final angle.

13. The method of claim 10, further including providing a lifting handle for tilting the container.

14. The method of claim 13, further including storing the lifting handle on the main frame.

15. The method of claim 11, in which at least one of the first and second wheel sets includes two wheels.

16. The method of claim 11, in which at least one of the first and second wheel sets includes a swiveling caster wheel.

* * * * *